United States Patent [19]
Hampl

[11] 3,857,385
[45] Dec. 31, 1974

[54] DIRECT INDICATING DEVICES FOR MEASURING RESPIRATORY RESISTANCE

[75] Inventor: Franz Hampl, Hoechberg, Germany

[73] Assignee: Erich Jaeger, Wurzburg, Germany

[22] Filed: June 5, 1973

[21] Appl. No.: 367,344

Related U.S. Application Data

[63] Continuation of Ser. No. 129,678, March 31, 1973, abandoned.

[52] U.S. Cl. .............................................. 128/2.08
[51] Int. Cl. ............................................... A61b 5/08
[58] Field of Search.... 128/2.07, 2.08, 2 R, DIG. 17

[56] References Cited
UNITED STATES PATENTS

| | | | |
|---|---|---|---|
| 3,036,569 | 5/1962 | Clements et al. ................. | 128/2.08 |
| 3,559,638 | 2/1971 | Potter .............................. | 128/2.08 |
| 3,621,833 | 11/1971 | Crane ............................. | 128/2.08 |

FOREIGN PATENTS OR APPLICATIONS

| | | | |
|---|---|---|---|
| 1,119,459 | 12/1961 | Germany ........................... | 128/2.08 |
| 850,750 | 10/1960 | Great Britain ..................... | 128/2.08 |

OTHER PUBLICATIONS

"Journ. Of Clinical Investigation," Vol. 38, No. 7, pp. 1262–1270, July 1959.
"Journ. of Applied Physiology," Vol. 8, pp. 587–594, May 1956.

Primary Examiner—Kyle L. Howell
Attorney, Agent, or Firm—Flynn & Frishauf

[57] ABSTRACT

A flow resistance chamber through which a person breathes has a flow resistance which can be rapidly switched between two values of resistance. The pressure differential across the resistance is measured, and the electrical output of the pressure difference measurement is switched between two storage circuits in synchronism with the switching of the flow resistance. This switching is done for a period that is short compared with the breath cycle. The quotient of the two pressure differences registered in the storage circuits is continuously formed and displayed on an indicator or recording.

7 Claims, 2 Drawing Figures

PATENTED DEC 31 1974  3,857,385 scribed below. The stored signal thus follows the output signal of the pressure sensing means 12 as long as the latter is connected with the related signal storage circuit 18 and then remains at the last-stored signal value when the connection between the pressure sensing means and the signal storage circuit concerned is interrupted by the switch 16.

Figure 1:
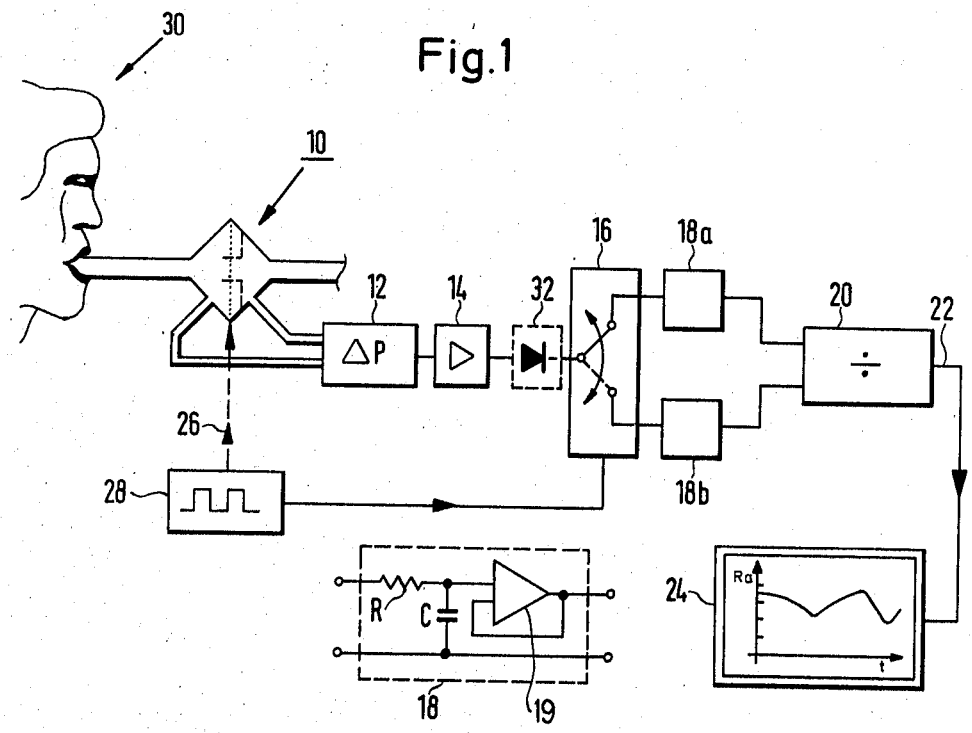

Each signal storage circuit can, as is indicated for example at the bottom of FIG. 1 in the rectangle 18 in broken lines, have a differential amplifier 19, a capacitor C and a resistor R, which are connected in the manner described. As shown in the diagram, one input of the differential amplifier 19 is used for a feedback connection.

The outputs of the signal storage circuits 18 are connected with a dividing circuit 20, whose output 22 provides an output signal corresponding to the quotient of the supplied signals. The output signal can be supplied to an indicating device, for example an oscilloscope or a registering device such as a plotter 24. The registering device can be calibrated directly in units of breath resistance $R_a$.

The flow resistance switch-over device denoted by an arrow 26 drawn in broken lines, and the actuating device for the switch 16 are coupled with a common timing means 28, which switches over the flow resistance 10 and the switch 16 synchronously. The switching over is preferably carried out periodically with a frequency which is substantially greater than the frequency of breathing.

Figure 2:
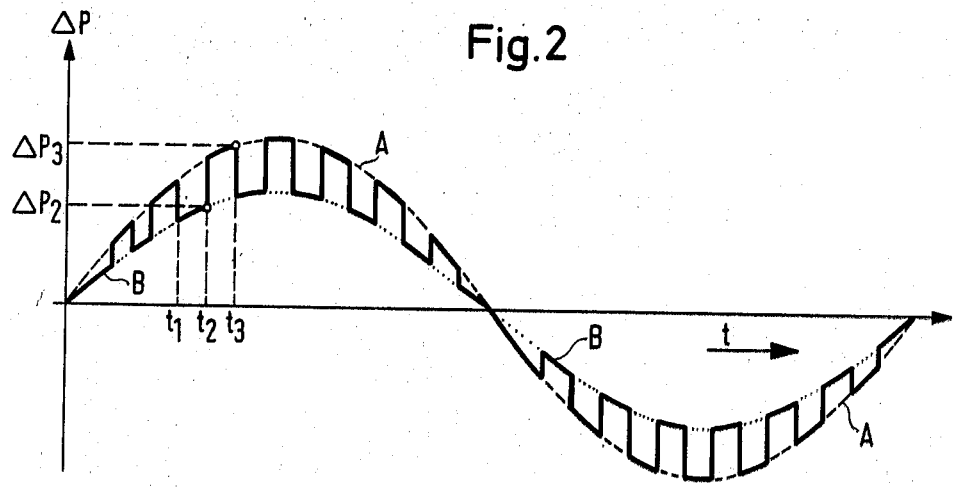

In operation a person 30 to be examined breathes through the flow resistance 10 by means of a mouth piece or a mask (not shown), so that the respiratory air flows through the resistance. When the flow resistance 10 has been set at its greater resistance value, the pressure drop $\Delta P$ runs in accordance with the curve A in FIG. 2, which has the greater swing about the horizontal graph axis and is partially drawn in full lines and partially in interrupted lines. When the flow resistance has its smaller value, the pressure drop varies in accordance with the curve B which is partly in the form of dots and is nearer to the horizontal graph axis. When the resistance to respiratory air is periodically switched over between its two resistance values, the pressure drop across the flow resistance 10 varies in accordance with the full lines drawn in FIG. 2, with generally rectangular pulses, comprising parts of curves A and B.

In operation the flow resistance and the switch 16 are switched over synchronously, preferably periodically. The signal storage circuits 18a and 18b then respectively store the signal values which correspond to the curves A and B. In the time interval between $t_1$ and $t_2$ the signal storage circuit 18b is for example connected with the output of the differential pressure sensing means 12 and at the time $t_2$ it stores a signal in accordance with $\Delta P_2$. Simultaneously with the switching over of the resistance value the switch 16 switches of the output of the amplifier 14 from the signal storage circuit 18b and connects it with the signal storage circuit 18a, which now in the time between $t_2$ and $t_3$ stores a signal corresponding to the pressure difference $\Delta P_3$. The dividing circuit 20 continuously forms a quotient signal corresponding to the quotient of the signals stored in the signal storage circuits 18a and 18b, i.e., a signal corresponding to $\Delta P_3/\Delta P_2$, which is recorded by the registering device 24 (possibly after smoothing by a low pass filter not shown). The recording then indicates the variation in time of the respiratory resistance during breathing. If the vertical axis of the recording is calibrated in values of $R_a$, no further evaluation is needed.

The signal transfer path between the flow resistance and the recording or indicating device can comprise a switching member which ensures that the respiratory resistance $R_a$ is only recorded and/or indicated during one breathing phase, for example only during breathing out. For this purpose a rectifying circuit 32, for example, is all that is required between the differential pressure sensing means 12 and the amplifier 14 (or between the latter and the switch 16).

If the respiratory resistance is to be measured both during breathing in and also during breathing out, the pressure sensing means 12 and the switch 16 can have a twin path rectifier circuit connected between them.

I claim:

1. A direct indicating device for continuously measuring the internal resistance of a person's respiratory system comprising:
   a flow resistance chamber having a connection adapted for the person's mouth or nose and a connection to the atmosphere and having an interposed variable resistance means, switchable between two finite values of resistance, through which air breathed by said person through said mouth or nose connection must pass;
   flow resistance switching means operatively connected with said variable resistance means for switching said resistance means between said two values of resistance;
   pressure sensing means connected to said chamber and responsive to the pressure difference across said flow resistance means and including means for providing an electrical output representative of said pressure difference;
   two electrical storage means for storing differential pressure output signals of said pressure sensing means respectively related to said two resistance values, each of said storage means having an input and an output connection and includes means capable of following a signal provided to said input connection and of storing the last value of the signal so provided when said input connection is disconnected from said pressure sensing means;
   signal switching means synchronized with said flow resistance switching means arranged for alternately connecting each of said storage means to said electrical output of said pressure sensing means;
   timing means including means for causing repetitive back-and-forth operation, in synchronism, of said flow resistance switching means and for said signal switching means at intervals short compared with a person's normal breathing cycle;
   quotient producing means responsive to the respective signals present in said two storage means, and indicating means responsive to said quotient producing means for continuously indicating respiratory resistance of said person during at least one direction of breathing,
   said indicating means being capable of and arranged for responding to variations of the output of said quotient producing means within any unidirectional breath flow period of the person's breathing cycle.

2. A direct indicating device for continuously measuring respiratory resistance as defined in claim 1 in which:

flow direction responsive means are interposed in the signal path between said pressure sensing means and said signal switching means for switching off the signal supplied to said signal switching means during periods of breath flow in one direction of breathing.

3. A direct indicating device for measuring respiratory resistance as defined in claim 1, in which:

a path rectifying means is interposed in the signal path between said pressure sensing means and said signal switching means and is arranged to switch the polarity of the output signal of said pressure sensing means or of a signal derived therefrom, so that the polarity of the output of said quotient producing means will remain the same regardless of direction of respiratory air flow through said flow resistance chamber.

4. A direct indicating device for continuously measuring respiratory resistance as defined in claim 1 in which said storage means includes means for rapid setting of the storage level therein during alternate switching intervals of said signal switching means to a new value of said electrical output of said pressure sensing means, in the event of change of such value, and includes means for maintaining the storage level therein substantially constant during the other switching intervals of said signal switching means.

5. A direct indicating device for continuously measuring respiratory resistance as defined in claim 2 in which said storage means includes means for rapid setting of the storage level therein during alternate switching intervals of said signal switching means occurring during periods of breath flow in the direction of breathing for which said flow direction responsive means does not switch off the signal supplied to said signal switching means, such setting of said storage level being then effected to a substantially momentary value of said electrical output of said pressure sensing means, and in which during other switching intervals of said signal switching means, said storage means includes means for maintaining the storage level substantially constant.

6. A direct indicating device for continuously measuring respiratory resistance as defined in claim 2 in which said indicating means is a means for visually recording respiratory resistance as a function of time at least during periods of breath flow in one direction of breathing.

7. A direct indicating device for continuously measuring respiratory resistance as defined in claim 2 in which said indicating means is a means for visually displaying with brief persistance the respiratory resistance of a patient, at least during periods of breath flow in one direction of breathing.

* * * * *

UNITED STATES PATENT OFFICE
CERTIFICATE OF CORRECTION

Patent No. 3,857,385            Dated December 31, 1974

Inventor(s) Franz HAMPL

It is certified that error appears in the above-identified patent and that said Letters Patent are hereby corrected as shown below:

On the cover page, first column, following item [63] entitled "Related U.S. Application Data", insert

[30]      Foreign Application Priority Data

April 3, 1970    Germany .................... P 20 16 073.0

Signed and Sealed this thirteenth Day of April 1976

[SEAL]

Attest:

RUTH C. MASON
*Attesting Officer*

C. MARSHALL DANN
*Commissioner of Patents and Trademarks*